(12) United States Patent
Miller, Jr.

(10) Patent No.: US 6,442,249 B1
(45) Date of Patent: Aug. 27, 2002

(54) TELEPHONE CALL SCREENING UNIT

(76) Inventor: John T. Miller, Jr., 700 Questover La., Creve Coeur, MO (US) 63141

( * ) Notice: Subject to any disclaimer, the term of this patent is extended or adjusted under 35 U.S.C. 154(b) by 0 days.

(21) Appl. No.: 09/309,942

(22) Filed: May 11, 1999

(51) Int. Cl.[7] ............................................. H04M 11/00
(52) U.S. Cl. ..................... 379/93.09; 379/142; 379/199
(58) Field of Search ...................... 379/102.01, 102.02, 379/100.15, 100.16, 199, 188, 201.01, 93.17, 93.02–93.05, 93.09, 93.11, 142.01, 142.02, 142.05

(56) References Cited

U.S. PATENT DOCUMENTS

| | | |
|---|---|---|
| 4,429,188 A | 1/1984 | Allen |
| 4,656,657 A | 4/1987 | Hunsicker |
| 4,850,013 A | 7/1989 | Rose |
| 4,926,460 A | 5/1990 | Gutman et al. |
| 4,937,854 A | 6/1990 | Sarakas |
| 5,048,076 A * | 9/1991 | Maurer et al. .......... 379/100.15 |
| 5,056,132 A * | 10/1991 | Coleman et al. ....... 379/100.16 |
| 5,062,133 A * | 10/1991 | Melrose ................. 379/100.16 |
| 5,157,712 A | 10/1992 | Wallen, Jr. |
| 5,384,832 A | 1/1995 | Zimmerman et al. |
| 5,467,388 A | 11/1995 | Redd, Jr. et al. |
| 5,563,935 A | 10/1996 | Small |
| 5,615,257 A * | 3/1997 | Pezzullo et al. .......... 379/93.17 |
| 5,651,053 A | 7/1997 | Mitchell |
| 5,781,613 A | 7/1998 | Knuth et al. |
| 5,809,125 A | 9/1998 | Gammino |
| 6,298,122 B1 * | 10/2001 | Horne .................... 379/93.09 |

* cited by examiner

*Primary Examiner*—Wing F. Chan
(74) *Attorney, Agent, or Firm*—Polster, Lieder, Woodruff & Lucchesi (57) ABSTRACT

A call screening unit of the present invention is interposed between the telephone itself and the wall jack. When an incoming call is received, the call screening unit initially grabs the signal without allowing the signal to pass through to the phone. The call screening unit determines if the incoming call has a valid carrier signal. If the call has a valid carrier signal, the call is allowed to pass through, and the phone rings. If the call has an invalid carrier signal, the caller is prompted to enter an override code. The override code entered is compared with stored override codes. If a valid override code is entered, then the call is allowed through, and the phone rings. If a valid override code is not entered, the call is terminated, and the phone never rings. The call screening unit includes a fax switch which can be set to be "on" or "off". If the fax switch is set to "on", the call screening unit will also determine if the signal is a fax/computer signal, and will allow fax calls to pass through. Thus, the user's phone will only ring if the incoming call has a valid carrier signal, if a proper override code was entered by the caller, of if the call has a fax/computer signal and the fax switch is set to "on." The call screening unit also allows for a user to display, delete, print, and change override codes. To do so, a personal identification code must be entered. If a valid personal identification code is not entered after a predetermined number of tries, the call screening unit will sound an alarm.

20 Claims, 5 Drawing Sheets

TELEPHONE CALL SCREENING UNIT

CROSS-REFERENCE TO RELATED APPLICATIONS

This application is related to Document Disclosure No. 434055, filed Apr. 1, 1998.

STATEMENT REGARDING FEDERALLY SPONSORED RESEARCH OR DEVELOPMENT

Not Applicable.

BACKGROUND OF THE INVENTION

This invention relates to telephone call screening units, and, in particular, to a call screening unit which automatically allows calls through which have a valid carrier signal.

Households get numerous harassing or threatening calls as well as calls from telemarketers, sales people, pollsters, etc. who try and sell the consumer any number of different types of things. These calls usually come at inconvenient times, typically during meal time. Further, such callers often let the phone ring only once or twice, which is generally not enough time to answer the phone.

Normal telephone calls have a valid carrier signal that can be easily traced to a specific number, using, for example, Caller ID™ equipment. Other types of phone calls do not have a valid carrier signal. Calls that do not have a valid carrier signal appear as "out-of-area, private, or anonymous" calls. Additionally, calls from mobile phones, non-compatible telephone services and/or systems, and callers using a call forwarding function or a *67 prefix (the anonymous calling prefix) also have invalid signals. Most calls from telemarketers, pollsters, sales people, etc. are either private, anonymous, or out-of-area, and hence have invalid carrier signals.

Currently, if a user screens incoming calls, he can use his answering machine by listening to the message the caller leaves when the answering machine answers the phone. If the user wants to accept the call, he can pick up the phone before the caller hangs up. However, sometimes the caller does not give the user enough time to pick up the phone. Additionally, telemarketers, sales people, pollsters, etc. will usually not let the phone ring more than a few times or will not leave a message. Also, the answering machine may not be in a convenient area, and it may be difficult for the user to hear the caller's message. This all makes it almost impossible to effectively screen incoming telephone calls.

There are several call screening devices currently available. One such device is sold by TeleScreen Inc. of Los Angeles, Calif. under the name TeleScreen. The TeleScreen device, like many of the other call screening devices that have been developed, pre-empt all phone calls, including phone calls from friends, relatives, etc. that the user would normally want to pass through. This is obviously undesirable. It is desirable to allow through local calls, such as calls from friends, family, school, or emergency personnel, so that such callers need not enter an override code for their call to pass through.

BRIEF SUMMARY OF THE INVENTION

Briefly stated, the call screening unit of the present invention is interposed between the telephone itself and the wall jack. When an incoming call is received, the call screening unit initially grabs the signal without allowing the signal to pass through to the phone. The call screening unit examines the signal of the incoming call to determine if it has a valid carrier signal. If the call has a valid carrier signal, the call is allowed to pass through, and the user's phone rings. If the incoming phone call has an invalid carrier signal, the person placing the call is prompted to enter a valid override code. The override code entered is compared with a series of user stored override codes. If a valid override code is entered, then the call is allowed through, and the phone rings. If a valid override code is not entered, then the call is terminated, and the phone never rings. The call screening unit includes a fax switch which can be set to be "on" or "off". If the fax switch is set to "on", the call screening unit will also determine if the signal is a fax/computer signal. If the signal is a fax/computer signal, the call will be allowed to pass through. Thus, the user's phone will only ring if the incoming call has a valid carrier signal, if a valid override code was entered by the caller, of if the call has a fax/computer signal and the fax switch is set to "on."

The call screening unit includes key pads for setting, changing, and deleting user stored override codes and an authorization or Personal Identification Code (PIC). It also includes a printer for printing the user stored and caller entered override codes and an LED display which displays the user stored and caller entered override codes. Whenever user stored override codes are changed, displayed, deleted, or printed, the call screening unit prompts the user for an authorization code or PIC. A valid PIC must be entered before override codes can be changed, displayed, deleted or entered. The user has a predetermined number of tries to enter a valid PIC when carrying out one of these functions. If, after this predetermined number of tries, a valid PIC is not entered, an alarm is sounded. The helps prevent unauthorized users from changing, displaying, deleting, or printing the user stored override codes.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what I presently believe is the best mode of carrying out the invention.

An incoming telephone call has either a valid or invalid carrier signal. An invalid carrier signal comes from a private, anonymous, or out-of-area carrier signal (i.e., does not contain caller ID information), or a fax or computer generated signal. Harassing or threatening calls as well as phone calls from telemarketers, pollsters and the like generally have invalid carrier signals, and are typically not welcome.

As will be set out in more detail below, the call screening unit 1 of the present invention is interposed between the telephone itself and the wall jack. When an incoming call is received, the call screening unit 1 initially grabs the signal without allowing the signal to pass through to the phone. Thus, the phone does not immediately ring. The call screening unit 1 examines the signal of the incoming call to determine if it has a valid carrier signal. If it does have a valid carrier signal, the call is allowed to pass through, and the phone rings, indicating that a call has been received. The user can then answer the phone. If the phone has an invalid carrier signal, the caller must enter a valid override code. If a valid override code is entered, then the call is allowed through, and the phone rings. If a valid override code is not entered, then the call is terminated, and the phone never rings. Thus, the user's phone will only ring if the incoming call has a valid carrier signal, or if a proper override code was entered by the caller. As described below, the unit can also allow fax calls through.

Figure 1:
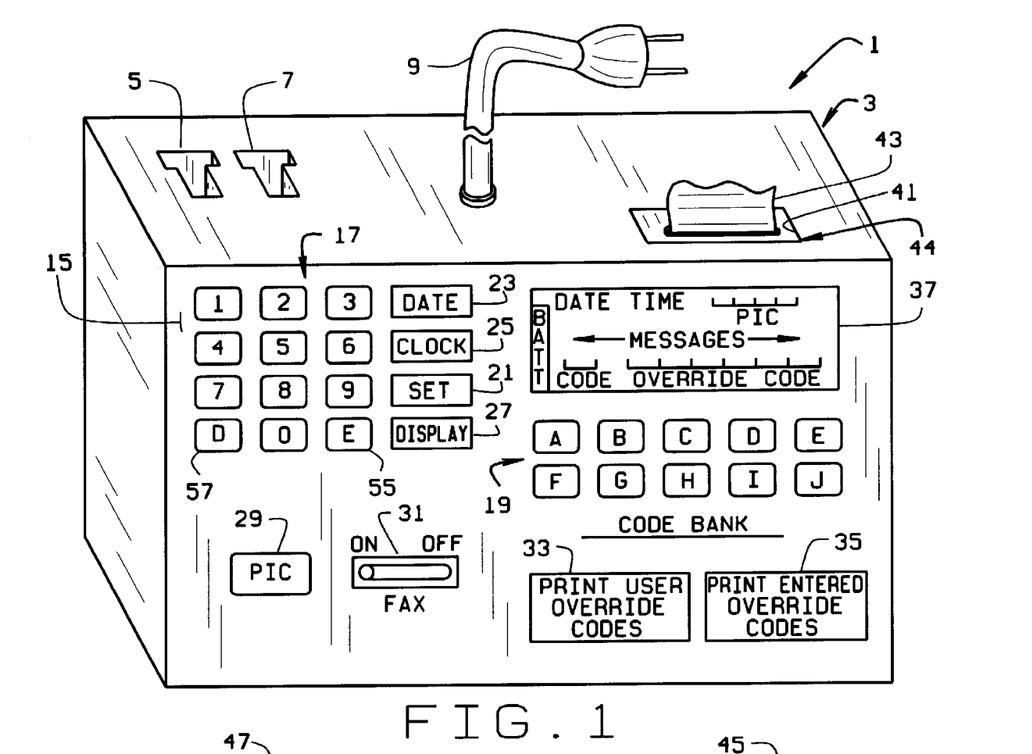
FIG. 1 is a front perspective view of a call screening unit of the present invention.
Figure 2:
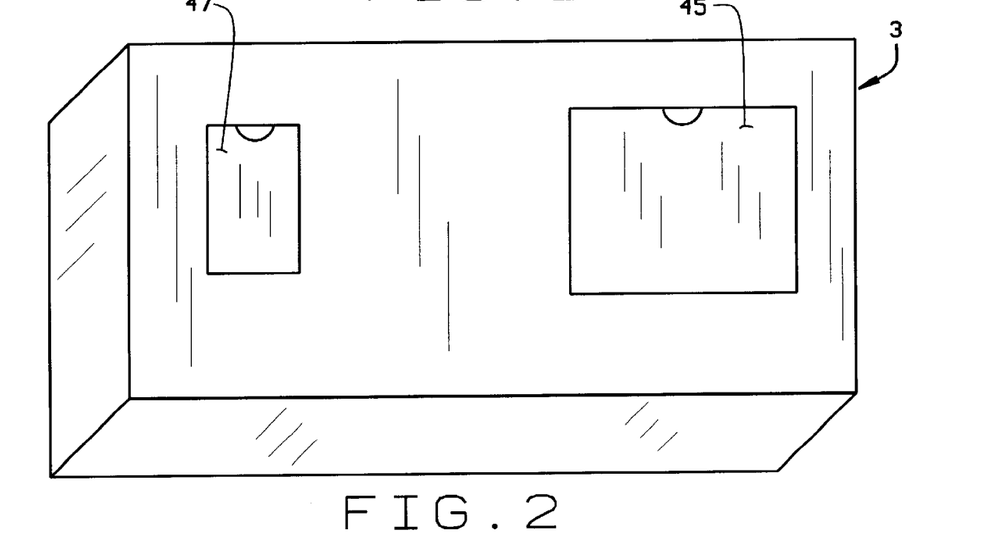
FIG. 2 is a rear perspective view of the call screening unit.
Figure 3:
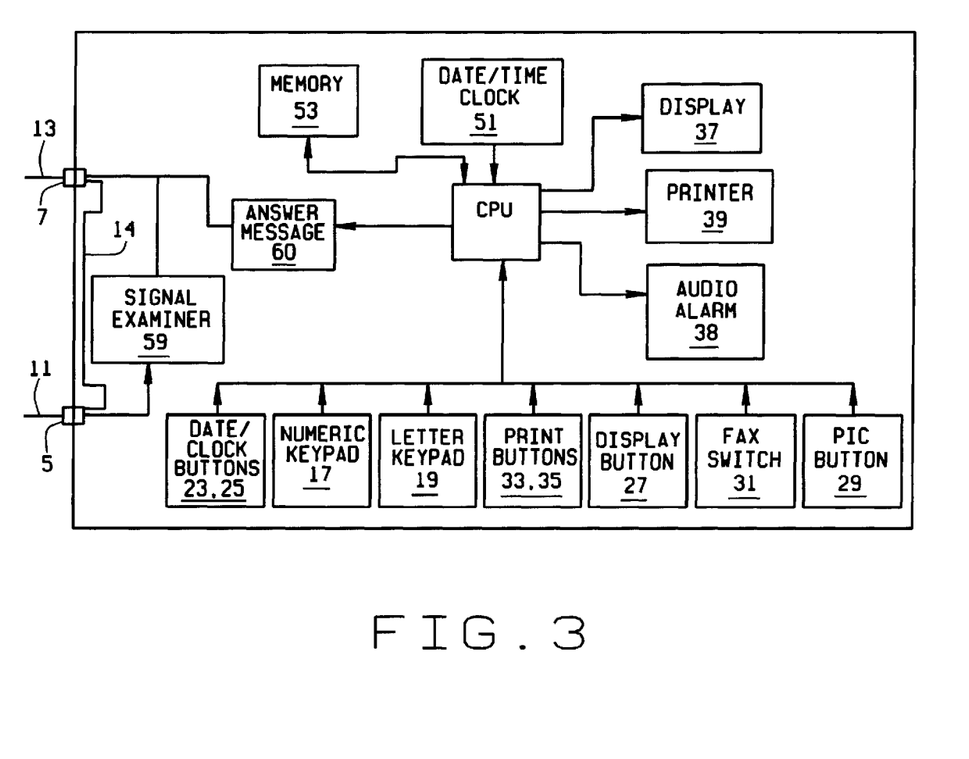
FIG. 3 is a block diagram of the components of the call screening unit.

An illustrative embodiment of the call screening unit 1 is shown in FIGS. 1 and 2. The call screening unit 1 is shown encased in a housing 3. The housing 3 includes in- and out-phone jacks 5 and 7, respectively, and a power cord 9 to connect the call screening unit 1 to a source of electricity (i.e., an electrical outlet in the house). The call screening unit 1 is interposed between the telephone and the wall jack. Thus, a phone cord 11 (FIG. 3) extends from the wall jack to the in-jack 5, and a second phone cord 13 extends from the out-jack 7 to the phone. A by-pass line 14 (FIG. 3) directly connects the in-jack 5 and the out-jack 7 to allow outgoing calls to be made without passing through the circuitry of the call screening unit 1. Although the call screening unit 1 is shown as a stand alone unit, it will be understood that it could be incorporated into a phone, in the same way that answering machines and Caller ID™ units are incorporated into phones.

On its front face 15 (FIG. 1), the call screening unit 1 includes a numeric key pad 17, a letter or code bank key pad 19 (ten keys are shown), a "Set" button 21, date and clock buttons 23 and 25, a "Display" button 27, a "PIC" button 29 to change or enter personal identification codes, a fax switch 31 to automatically allow the call screening unit 1 to allow fax and computer signals through, a print button 33 to print user stored override codes, a print button 35 to print caller entered override codes, and a display 37. The display 37 is preferably an LED display which includes a date and time display and a backup battery life indicator. The display 37 also has locations to display an individual override code and its associated override code letter, the user's PIC, and prompts. This information is displayed, as discussed below when override codes and PIC's are entered or changed. The prompts, as discussed below, prompt users through various functions, as described below. The call screening unit 1 also includes an alarm 38 (FIG. 3) which sounds when an unauthorized information request is made. Preferably, the display is blank, and information is displayed only when the call screening unit's functions are used. By limiting the amount of time the display is activated to display information, the battery will not be drained very quickly when there is a power outage.

The call screening unit 1 also includes a printer 39 (FIG. 3) within the housing 3. The printer can be any type of conventional printer which can fit within the housing 3. For example, the printer can be a dot-matrix printer or an ink jet printer. A slot 41 (FIG. 1) in the back of the housing 3 allows for a printed paper tape 43 to exit the housing. A removable panel 44 allows for replacement of the printer ribbon or cartridge. The printer is operated by the print buttons 33 and 35 to print the user stored override codes and the caller entered override codes, both of which are stored in the call screening unit's memory 53. The bottom of the housing 3 includes an access panel 45 so that the user can install the paper tape 43 or ink cartridges and an access panel 47 which provides access to a backup battery (not shown).

To initially set up the call screening unit 1, the user sets the internal clock 51 to the correct date and time. The user presses the clock button 25, and using the numeric keypad 17, enters the correct time. The time is then set by pressing the "Set" button 21. The time can be entered either as a 12-hour clock or a 24-hour clock. The user then presses the date button 23, and using the numeric keypad 17 and the "Set" button 21 sets the date. The date is preferably set in a "MMDDYYYY" format, but could be displayed in other formats as well. The display 37 shows the date and time as they are entered, and, once set, the display returns to a blank screen.

Figures 5, 6:
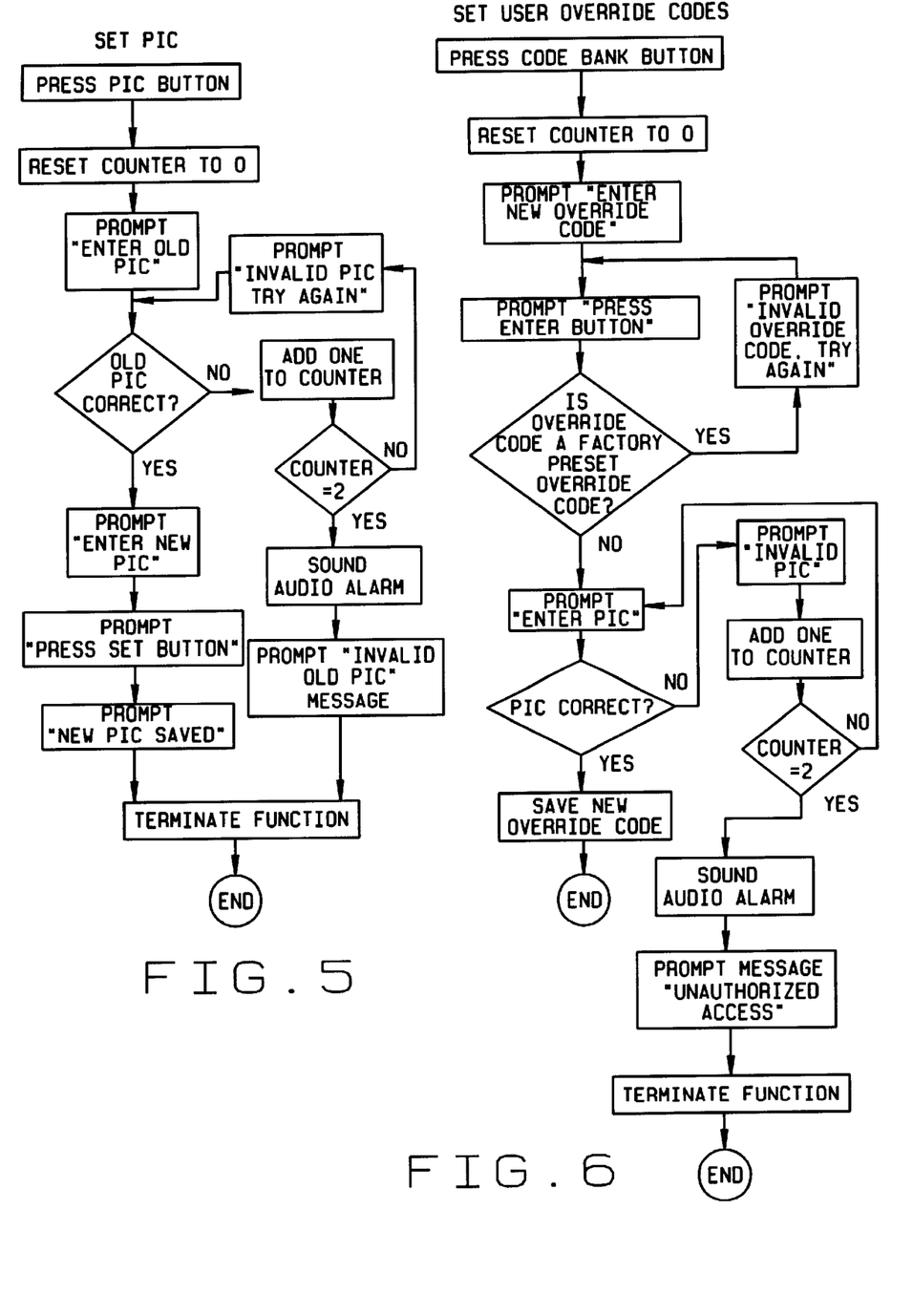
FIG. 5 is a flow chart showing how a Personal Identification Code (PIC) is changed.
FIG. 6 is a flow chart showing how override codes are entered.

The user can then set his PIC or Personal Identification Code. The PIC is preferably a 4-digit numeric code which is stored in the memory module 53. The PIC is required for changing, deleting, printing, and displaying user stored override codes, and printing stored caller entered override codes (i.e., the codes that must be entered by callers if their call has an invalid carrier signal). Thus, an unauthorized person cannot alter, display, delete, or print the user stored override codes or display or print the stored caller entered override codes. The process of setting the PIC is shown in FIG. 5. The PIC is set by first pressing the "PIC" button 29. A prompt for the old PIC will appear on the display, and the user enters his old PIC. The call screening unit 1 can be preprogrammed with a factory installed PIC, such as "7777" which must be entered by the user so that he can replace the factory set PIC with a new PIC. The call screening unit 1 compares the entered PIC with the stored or old PIC. If the entered code is incorrect (i.e., does not match the stored PIC), the display prompts the user with a message of "invalid PIC," or a similar message. The user can then try again. If a valid old PIC is not entered after a pre-set number of tries (for example, 3), an alarm 38 will sound. If the entered code is correct, the display prompts the user with a message of "New PIC" or a similar message. The user then enters the new PIC and presses the "Set" button 21 to store the new PIC in the unit's memory module 53. The PIC can be changed at any time following the same series of steps.

The process for setting or changing user override codes is shown in FIG. 6. To set (or change) user override codes stored in the memory 53, the user presses one of the code buttons A–J from the alphabetical, or code bank, keypad 19. The user then enters the new code using the numeric keypad 17. Preferably, the override code is a six-digit code. However, the override code can be longer or shorter if desired. Once the new override code has been entered, the user presses the "Enter" button 55. The call screening unit 1 then prompts the user for his PIC. If the user enters the correct PIC, the call screening unit 1 stores the new override code in memory module 53. If an incorrect PIC was entered, the call screening unit 1 prompts the user with the message "invalid PIC" and the user can try again. If, after a pre-set number of invalid attempts to enter the PIC, the audio alarm 38 will sound; the message "unauthorized access" will show on the display 37; the function will be terminated; and the call screening unit 1 will return to a stand-by mode. This process is repeated for each of the ten codes (A–J) that can be stored in the call screening unit's memory 53. The call screening unit 1 can be designed to accept more or fewer override codes. The process could be changed to require the entry of the PIC before the new override code is entered, so that the PIC does not have to be entered for each code that is set. Rather, the PIC would be entered for each override code setting session. Once the user enters the override codes, he informs his friends, relatives, etc. of the codes which they can use to have their calls pass through the call screening unit 1.

When the call screening unit 1 is assembled, the user override code memory addresses all set to contain the same value. This can be "000000" or "999999" or some other factory preset value. Thus, the call screening unit 1 preferably discourages setting the override codes to these values. Therefore, when the user override codes are being programmed, if the user enters the factory pre-set override code, the call screening unit 1 will display the message "Invalid Override Code" and will not store the override code. The user must then enter an acceptable override code (i.e., an override code which is not the same as the factory pre-set override code).

Figure 7:
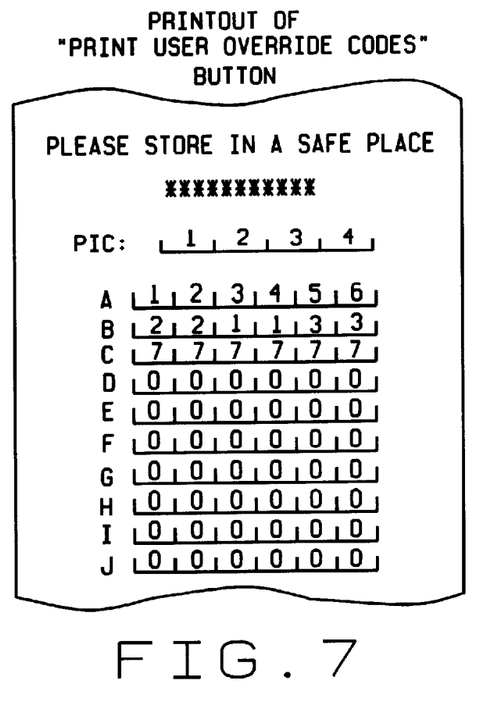
FIG. 7 shows a printout made when the "Print User Override Codes" button is pressed, and shows that the user has entered three codes, the remaining codes being factory set codes.

The user can at any time print out the user stored override codes by pressing the "Print User Override Codes" button 33. An example of the print-out is shown in FIG. 7. The printout in FIG. 7 shows that the user set three of the ten override codes. Codes D–J still are set to "0000000", and thus have not yet been set. When the print button 33 is pressed, the call screening unit 1 will prompt the user to enter a PIC to ensure that the request is authorized. If the PIC is correctly entered, the call screening unit 1 will print the codes on the paper tape 43. If the an invalid PIC is entered, the call screening unit 1 will prompt the user with a message of "invalid PIC." If, after a pre-set number of invalid attempts to enter the PIC, the audio alarm 38 will sound; the message "unauthorized access" will show on the display 37; the function will be terminated; and the call screening unit 1 will return to a stand-by mode.

Similarly, the user can display the codes individually on the display. The user first presses the display button 27 and then one of the code bank buttons 19. The call screening unit 1 prompts the user for his PIC to ensure that the request is authorized. If a valid PIC is not entered after a pre-set number of attempts, the audio alarm 38 will sound; the message "unauthorized access" will show on the display 37; the function will be terminated; and the call screening unit 1 will return to a stand-by mode. When the proper PIC is entered, the code (i.e., A–J) and its corresponding override code will be shown on the display.

As incoming calls are received by the call screening unit 1, the override codes entered by callers are stored in the call screening unit's memory module 53. The memory module stores the last twenty override codes entered by callers, as well as the date and time the override code was used. As new calls are made, and override codes are entered, information relating to older calls is replaced. Thus, initially, the twenty memory addresses in which caller entered override codes are stored are empty. These addresses are fill sequentially as new calls are received. After the twenty memory address are full, when the next override code is entered, the information in addresses 2–20 will be moved in to the memory addresses 1–19, and the code entered will be placed in the $20^{th}$ memory address location. The unit does not store all the caller entered override codes. Rather, the unit 1 stores only the valid override codes entered.

The user can display the override codes entered by callers, as well as the date and time the override code was used simply by pressing the display button 27. When the display button is pressed, the call screening unit 1 will prompt the user to enter the PIC. If a valid PIC is not entered after a pre-set number of attempts, the audio alarm 38 will sound; the message "unauthorized access" will show on the display 37; the function will be terminated; and the call screening unit 1 will return to a stand-by mode. When the proper PIC is entered, the used override codes will be individually displayed, along with the date and time the override code was entered. Each time the display button is pressed, the information in the next memory position (i.e., code entered and date and time used) will be displayed. If no action is taken after ten seconds, the display will be cleared, and the call screening unit 1 will return to its stand-by mode.

Figure 8:
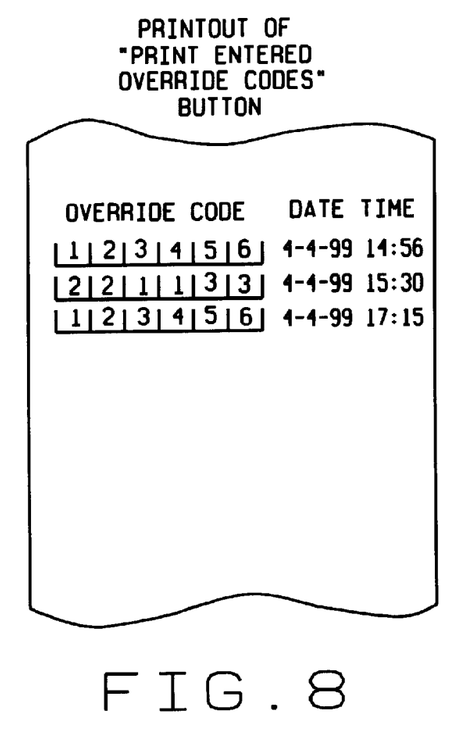
FIG. 8 shows a partial printout made by the call screening unit when the "Print Entered Override Codes" button is pressed.

The caller entered override codes can also be printed. An example of the printout is shown in FIG. 8. The entered override codes are printed by pressing the "Print Entered Override Codes" button 35. When the print button 37 is pressed, the call screening unit 1 will prompt the user to enter the correct PIC. If a valid PIC is not entered after a pre-set number of attempts, the audio alarm 38 will sound; the message "unauthorized access" will show on the display 37; the function will be terminated; and the call screening unit 1 will return to a stand-by mode. When the proper PIC is entered, the used override codes will be printed on the paper tape 43, along with the date and time the override codes were used.

The various caller entered override codes used to complete calls can be deleted to clear the memory. To delete the stored caller entered override codes, the user presses the display button 27. As above, the user must enter a correct PIC to use this function. If a correct PIC is entered, the call screening unit 1 will display the override code used, and the date and time the code was used. The user then presses the delete button 57 which is on the numeric key pad 17. The delete button 57 can be pressed repeatedly to delete the information relating to the caller entered override codes stored in the memory 53. If a valid PIC is not entered after a pre-set number of attempts, the audio alarm 38 will sound; the message "unauthorized access" will show on the display 37; the function will be terminated; and the call screening unit 1 will return to its stand-by mode.

The call screening unit 1 is normally in a stand-by mode, ready to accept new calls. When the user operates the call screening unit 1, for example to set the PIC, to set, print, or display the override codes, or to delete caller entered override codes, the call screening unit 1 is taken out of its stand-by mode and enters a programming/function mode. Once the user has completed the function, the call screening unit 1 returns to its stand-by mode. Every time the call screening unit 1 is taken into its programming/function mode, the user is prompted for a PIC to carry out the desired function. The user is given a set number of opportunities (for example, 3) to enter a correct PIC. Alternatively, the user could be given a set amount of time (for example 15 seconds) to enter a correct PIC. If a correct PIC is not entered after, for example, 3 tries, the alarm 38 will sound, the function will be terminated, and the call screening unit 1 will go back to its stand-by mode.

Figure 4:
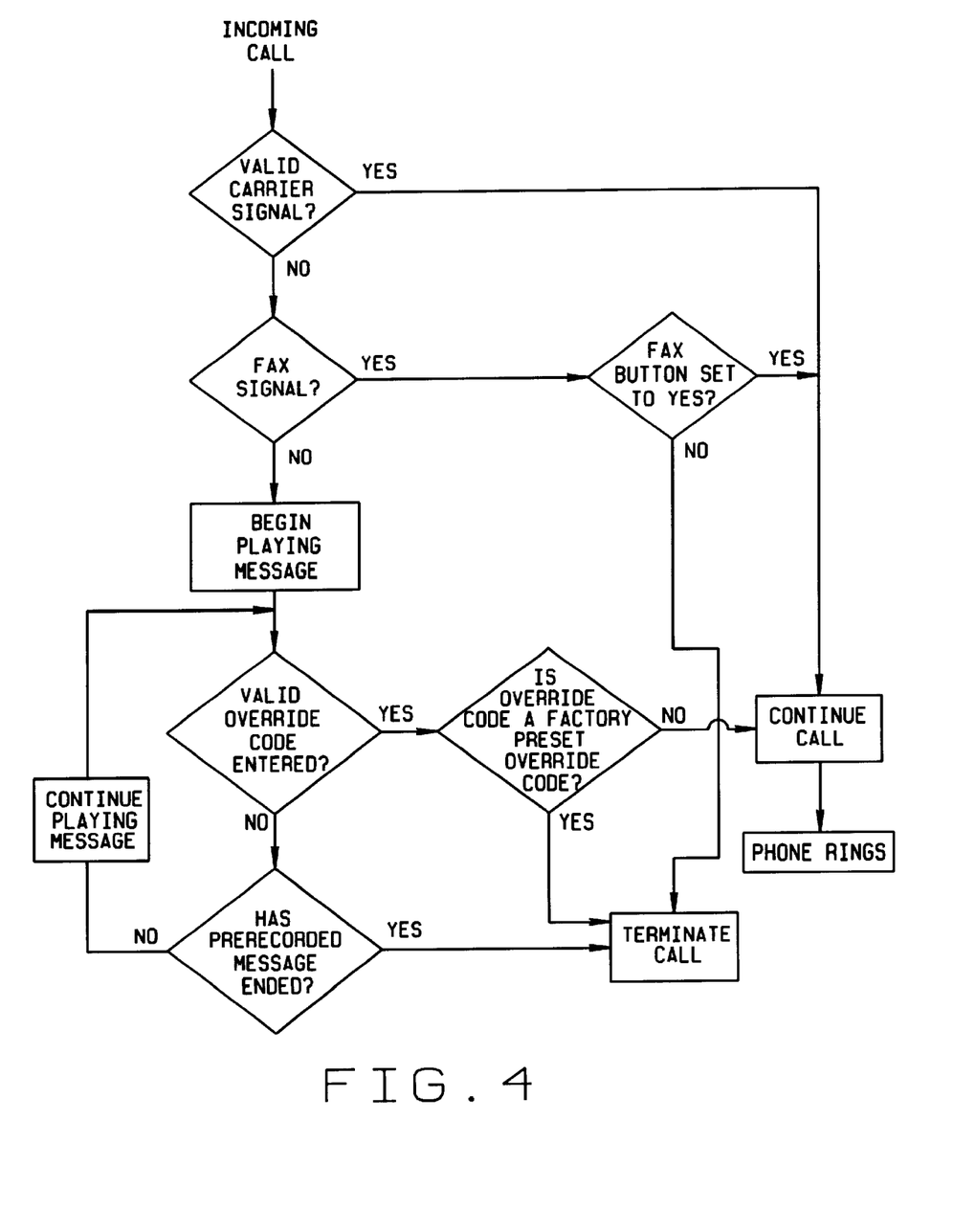
FIG. 4 is a flow chart of the operation of the call screening unit.

The operation of the call screening unit 1 itself will now be described. Referring to FIG. 4, when an incoming call is received, the call screening unit 1 intercepts the call before the call is passed through to the telephone. Thus, the telephone does not initially ring. The signal is examined by an examining module 59 (FIG. 3) to determine if the signal has a valid carrier signal. If the carrier signal is valid, then the incoming call is allowed to pass through, and the phone rings. If the carrier signal is not valid, the examining module 59 next determines if the signal is a fax or computer signal. If it is a fax or computer signal, and if the fax switch 31 is set to "on", the call is allowed to go through, so that an incoming fax can be received. If the signal is a fax or computer signal, and the fax switch is set to "off", then the call screening unit 1 terminates the call, without the phone ever ringing.

If the signal is neither a valid carrier signal nor a fax or computer signal, then the examining module causes the call screening unit's CPU to play a pre-recorded message 60 which is delivered to the caller. The answer message is pre-set at the factory. For example, the message can state: "If you are authorized to enter an override code, please do so at any time during the message . . . . This household does not accept such calls, please regard this as notice not to call again, and to remove this household's name and telephone number from your calling list." If desired, the call screening unit 1 can be provided with a microphone, so that the user can record his own outgoing message. The call screening unit 1 would then save this new outgoing message in the "Answer Message" module. In either event, the message prompts the caller to enter an override code. If an override code is not entered by the time the message terminates, the call screening unit 1 terminates the call. If the caller enters an override code, the caller entered override code is compared to the user stored override codes. If the caller entered override code corresponds to one of the user stored override codes, the call is allowed through, and the phone rings. This caller entered override code, as well as the date and time of the call, is then stored in the memory 53. If the entered override code is not valid (i.e., does not correspond to one of the user stored override codes), the caller will be given the option to try a new override code. The call screening unit 1 gives the caller a specific amount of time (i.e., until the message finishes or thirty seconds) to enter a valid override code. If a valid override code is not entered, then the call screening unit 1 terminates the call. Alternatively, the caller can be given a specific number of tries (for example three) to enter a valid override code. As noted, the call screening unit 1 stores caller entered override codes which are valid (i.e., correspond to one of the stored user override codes). The call screening unit 1 does not store caller entered override codes which are not valid and do not correspond to any of the user stored entered override codes.

As noted above, the override code memory addresses are pre-set at the factory to a desired number, i.e., "000000" or "999999". To prevent a caller from using these codes to by-pass the message, if a caller enters the pre-set factory override code as an override code, the code is not accepted, and the call is terminated. The call screening unit 1 can also give the caller the opportunity to enter a valid override code.

As can be appreciated, the user's phone only rings, and hence the user need answer the phone, if (1) the incoming call has a valid carrier signal; (2) the incoming call is a fax or computer signal, and the fax switch is turned to "on"; or (3) the incoming call has an invalid carrier signal and the caller enters a valid override code. Therefore, the user will not be bothered with calls from telemarketers, pollsters, sales people, etc. whose calls have an invalid carrier signal.

As various changes could be made in the above constructions without departing from the scope of the invention, it is intended that all matter contained in the above description or shown in the accompanying drawings shall be interpreted as illustrative and not in a limiting sense. For example, although the call screening unit 1 is designed to terminate the call if a valid override code is not entered, the call screening unit 1 could be combined with an answering machine. Thus, if an invalid code is entered, or even if no code is entered, instead of terminating the call, the call screening unit 1 could direct the call to the answering machine. Although the display 37 is described to be an LED display, other types of displays could be used. These examples are merely illustrative.

What is claimed is:

1. A call screening unit for screening incoming telephone calls directed to a specific telephone number; the call screening unit preventing a user's telephone from ringing unless the incoming call has a valid caller ID signal comprising numeric information or the caller making the incoming call enters a valid override code; the call screening unit including;
   a memory device for storing override codes;
   a discriminator which if the incoming call has a valid caller ID signal, the discriminator passing any call through to ring the user's telephone without further action by a caller if it is determined that the call has a valid caller ID signal;
   an answering device for playing a pre-recorded message which prompts the caller to enter an override code or leave a message if and only if the discriminator determines that the call does not have a valid caller ID signal; and
   a comparator which compares a caller entered override code with the override codes stored in the memory device.

2. The call screening unit of claim 1 including fax switch means for allowing calls having a fax/computer carrier signal to be passed through.

3. The call screening unit of claim 1 including a key pad for entering override codes which are stored in the memory device.

4. The call screening unit of claim 1 including a key pad for entering a personal identification code which is stored in a memory device.

5. The call screening unit of claim 4 including authorization means for preventing unauthorized users from changing, displaying, or printing the stored override codes.

6. The call screening unit of claim 5 wherein the authorization means prompts the user for an personal identification code and includes means for comparing the entered personal identification code to the stored personal identification code.

7. The call screening unit of claim 5 including an alarm which is sounded when unauthorized use of the call screening unit is attempted.

8. The call screening unit of claim 1 including a memory module for storing caller entered override codes.

9. The call screening unit of claim 8 including a printer for printing the caller entered override codes.

10. The call screening unit of claim 1 including a printer for printing the stored override codes.

11. The call screening unit of claim 1 including a display for displaying date and time, stored override codes, caller entered override codes, and prompting messages.

12. The call screening unit of claim 1 including means for preventing specific codes from being stored in the memory device as override codes.

13. The call screening unit of claim 1 wherein the comparator automatically rejects specific pre-set override codes entered by callers.

14. A method of screening incoming phone calls comprising:

determining if the incoming call has a valid caller ID signal comprising numeric information;

allowing any call through without further action by a caller if the call has a valid caller ID signal;

prompting the caller to enter an override code or leave a message if and only if the call does not have a valid caller ID signal;

comparing the entered override code with at least one stored override code; and     allowing the call through if the entered override code matches the stored override code.

15. The method of claim 14 including a step of determining if the incoming call has a fax/computer signal.

16. The method of claim 15 including a step of allowing the call to pass through if the incoming call has a fax/computer signal.

17. The method of claim 14 including a step of terminating the call if the entered override code does not match the stored override code.

18. The method of claim 14 including a step of directing the call to an answering machine if the entered override code does not match the stored override code.

19. The method of claim 14 including a step of enabling the caller to reenter an override code should entered override code not correspond to a stored override code.

20. The call screening unit of claim 1 including a device for storing messages of a caller if the call does not have a valid caller ID signal.

* * * * *

UNITED STATES PATENT AND TRADEMARK OFFICE
CERTIFICATE OF CORRECTION

PATENT NO. : 6,442,249 B1
DATED : August 27, 2002
INVENTOR(S) : John T. Miller, Jr.

It is certified that error appears in the above-identified patent and that said Letters Patent is hereby corrected as shown below:

<u>Column 8,</u>
Line 35, after the word switch, please delete the word "means". The claim 2 should read:

-- The call screening unit of claim 1 including fax switch for allowing calls having a fax/computer carrier signal to be passed through. --

Signed and Sealed this

Eleventh Day of February, 2003

JAMES E. ROGAN
*Director of the United States Patent and Trademark Office*